United States Patent
Kashu et al.

(10) Patent No.: US 12,012,145 B2
(45) Date of Patent: Jun. 18, 2024

(54) TRAVEL CONTROLLER AND METHOD FOR TRAVEL CONTROL

(71) Applicant: TOYOTA JIDOSHA KABUSHIKI KAISHA, Toyota (JP)

(72) Inventors: Takao Kashu, Tokyo-to (JP); Yasutaka Teramae, Kawasaki (JP); Hirotaka Kato, Aichi-ken (JP); Ryo Masutani, Tokyo-to (JP); Ichi Gi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 345 days.

(21) Appl. No.: 17/406,426

(22) Filed: Aug. 19, 2021

(65) Prior Publication Data
US 2022/0063721 A1    Mar. 3, 2022

(30) Foreign Application Priority Data
Aug. 26, 2020    (JP) .................................. 2020-142816

(51) Int. Cl.
*B62D 15/02*    (2006.01)
(52) U.S. Cl.
CPC .................................. *B62D 15/025* (2013.01)
(58) Field of Classification Search
CPC ............. B62D 15/025; B62D 15/0255; B60W 30/18163
USPC .......................................................... 701/41
See application file for complete search history.

(56) References Cited

U.S. PATENT DOCUMENTS

| | | | |
|---|---|---|---|
| 2015/0353127 A1* | 12/2015 | Takeda ................... | B62D 6/008 701/41 |
| 2017/0057543 A1* | 3/2017 | Sakaguchi ........... | B62D 15/029 |
| 2018/0105170 A1* | 4/2018 | Nagae ................... | B60W 30/12 |
| 2018/0297591 A1* | 10/2018 | Minemura ............ | B60W 40/00 |
| 2019/0382023 A1 | 12/2019 | Takeda et al. | |
| 2019/0389463 A1* | 12/2019 | Mizutani .............. | G05D 1/0291 |
| 2020/0082724 A1 | 3/2020 | Oguro et al. | |
| 2021/0081682 A1* | 3/2021 | Kumano ............ | G01C 21/3602 |
| 2022/0135039 A1* | 5/2022 | Jardine ........... | B60W 30/18159 701/26 |

FOREIGN PATENT DOCUMENTS

| | | |
|---|---|---|
| JP | 2017159723 A | 9/2017 |
| JP | 2019207190 A | 12/2019 |
| WO | 2018/123014 A1 | 7/2018 |
| WO | 2018/123019 A1 | 7/2018 |

* cited by examiner

*Primary Examiner* — Scott A Reinbold
(74) *Attorney, Agent, or Firm* — Dickinson Wright, PLLC

(57) ABSTRACT

A travel controller detects a non-lane zone within a predetermined distance ahead of a current position of a vehicle. The non-lane zone lacks lanes. The travel controller controls travel of the vehicle in the non-lane zone so as to keep the position of the vehicle relative to the width of a whole road. When an expected position of the vehicle at the end of the non-lane zone straddles a lane line, the travel controller controls travel of the vehicle so as to move to a lane having a larger overlap with the vehicle, prior to control of travel of the vehicle to keep the position of the vehicle relative to the width of the whole road.

4 Claims, 7 Drawing Sheets

TRAVEL CONTROLLER AND METHOD FOR TRAVEL CONTROL

FIELD

The present disclosure relates to a travel controller and a method for automatically controlling travel of a vehicle.

BACKGROUND

A travel controller is known that automatically controls travel of a vehicle, based on a surrounding image generated by a camera mounted on the vehicle. The travel controller detects lane lines from the surrounding image, and controls travel of the vehicle so that it will travel along a lane defined by the lane lines.

International Publication No. 2018/123014 (hereafter, "Patent Literature 1") describes a vehicle control system that determines behavior of a host vehicle to perform autonomous driving. The vehicle control system described in Patent Literature 1 obtains, from an external device, information on history of travel of other vehicles in a section where no lane line can be recognized, and determines behavior of the host vehicle, based on the history of travel obtained from the external device, when such a section exists.

SUMMARY

In a road the number of whose lanes changes before and after a zone where no lane line can be recognized (non-lane zone), there is no one-to-one correspondence between lanes before and after the non-lane zone. For this reason, a travel controller cannot uniquely determine the lane to be traveled after the non-lane zone, based on the position of the lane traveled before the non-lane zone. This may result in the travel controller performing control to make a lane change unexpected for a driver, in a road the number of whose lanes changes before and after a non-lane zone.

It is an object of the present disclosure to provide a travel controller that can reduce lane changes unexpected for a driver before and after a non-lane zone.

A travel controller according to the present disclosure includes a processor configured to detect a non-lane zone within a predetermined distance ahead of a current position of a vehicle, the non-lane zone lacking lanes; control travel of the vehicle in the non-lane zone so as to keep the position of the vehicle relative to the width of a whole road; and control travel of the vehicle so as to move to a lane having a larger overlap with the vehicle, prior to control of travel of the vehicle to keep the position of the vehicle relative to the width of the whole road, when an expected position of the vehicle at the end of the non-lane zone straddles a lane line.

The processor of the travel controller according to the present disclosure is preferably configured to control travel of the vehicle, in control of travel of the vehicle for the case that an expected position of the vehicle at the end of the non-lane zone straddles a lane line, so as to move to a lane on the side of a travel lane of the road, in the case that overlaps with the vehicle in two lanes divided by the lane line straddled by the expected position of the vehicle are equal.

The processor of the travel controller according to the present disclosure is preferably configured to control travel of the vehicle, in control of travel of the vehicle for the case that an expected position of the vehicle at the end of the non-lane zone straddles a lane line, so as to move to a lane such that the distance from the vehicle to a leading vehicle in the lane will be longer when the vehicle reaches the expected position, in the case that overlaps with the vehicle in two lanes divided by the lane line straddled by the expected position of the vehicle are equal.

The processor of the travel controller according to the present disclosure is preferably further configured to notify a driver of the vehicle of a request from detection of the non-lane zone until the vehicle reaches the non-lane zone, the request asking the driver to hold a steering wheel.

The processor of the travel controller according to the present disclosure is preferably further configured to reduce reactive force against turning the steering wheel during travel in the non-lane zone lower than reactive force during travel in a zone other than the non-lane zone.

A method for travel control according to the present disclosure includes detecting a non-lane zone within a predetermined distance ahead of a current position of a vehicle, the non-lane zone lacking lanes; controlling travel of the vehicle in the non-lane zone so as to keep the position of the vehicle relative to the width of a whole road; and controlling travel of the vehicle so as to move to a lane having a larger overlap with the vehicle, prior to the control of the vehicle, when an expected position of the vehicle at the end of the non-lane zone straddles a lane line.

The travel controller according to the present disclosure can reduce lane changes unexpected for a driver before and after a non-lane zone.

DESCRIPTION OF EMBODIMENTS

Hereinafter, a travel controller that can reduce lane changes unexpected for a driver before and after a non-lane zone will be explained in detail with reference to the accompanying drawings. Within a predetermined distance ahead of a current position of a vehicle, the travel controller detects a non-lane zone lacking lanes. The travel controller controls travel of the vehicle in the non-lane zone so as to keep the position of the vehicle relative to the width of a whole road. When an expected position of the vehicle at the end of the non-lane zone straddles a lane line, the travel controller controls travel of the vehicle so as to move to a lane having a larger overlap with the vehicle.

Figure 1:
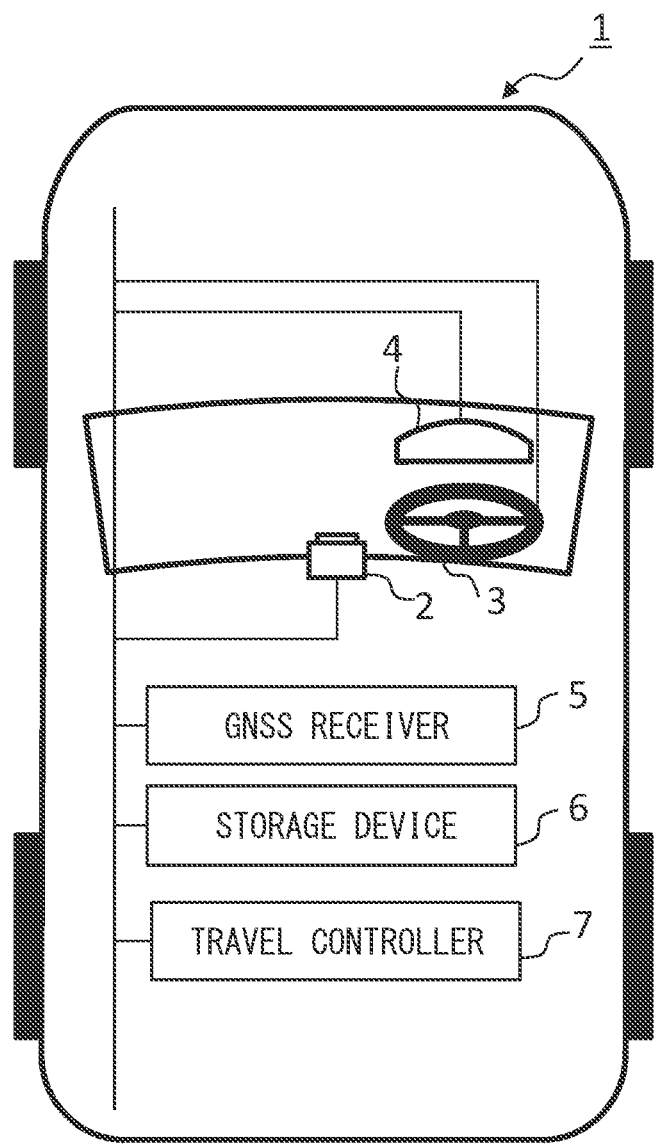
FIG. 1 schematically illustrates the configuration of a vehicle including a travel controller.

FIG. 1 schematically illustrates the configuration of a vehicle including a travel controller.

The vehicle 1 includes a camera 2, a steering wheel 3, a meter display 4, a global navigation satellite system (GNSS) receiver 5, a storage device 6, and a travel controller 7. The camera 2, the steering wheel 3, the meter display 4, the GNSS receiver 5, and the storage device 6 are connected to the travel controller 7 via an in-vehicle network conforming to a standard, such as a controller area network, so that they can communicate with each other.

The camera 2 is an example of a sensor for detecting surroundings of the vehicle. The camera 2 includes a two-dimensional detector constructed from an array of optoelectronic transducers, such as CCD or C-MOS, having sensitivity to visible light and a focusing optical system focusing an image of a target region on the two-dimensional detector. The camera 2 is disposed, for example, in a front and upper area in the interior of the vehicle and oriented forward, takes a picture of the surroundings of the vehicle 1 through a windshield every predetermined capturing period (e.g., $\frac{1}{30}$ to $\frac{1}{10}$ seconds), and outputs images corresponding to the surroundings.

The steering wheel 3 is an example of an operation unit, and is operated by a driver who makes a steering mechanism for steering the vehicle 1 operate. The operation to make the steering mechanism operate is, for example, turning the steering wheel 3 clockwise or counterclockwise. As other operation units, the vehicle 1 includes an accelerator pedal and a brake pedal (not shown).

The meter display 4 is an example of a display, and includes, for example, a liquid crystal display. The meter display 4 displays information on travel of the vehicle 1 so as to be visible to the driver, according to a signal received from the travel controller 7 via the in-vehicle network.

The GNSS receiver 5 receives a GNSS signal from a GNSS satellite at predetermined intervals, and determines the position of the vehicle 1, based on the received GNSS signal. The GNSS receiver 5 outputs a positioning signal indicating the result of determination of the position of the vehicle 1 based on the GNSS signal to the travel controller 7 via the in-vehicle network at predetermined intervals.

The storage device 6 is an example of a storage unit, and includes, for example, a hard disk drive or a nonvolatile semiconductor memory. The storage device 6 stores a high-precision map, which includes, for example, information indicating lane lines on roads included in a predetermined region shown on this map.

The travel controller 7 is an electronic control unit (ECU) including a communication interface, a memory, and a processor. The travel controller 7 detects a non-lane zone ahead of the vehicle 1, based on an image received from the camera 2 via the communication interface, and controls travel of the vehicle in the non-lane zone.

Figure 2:
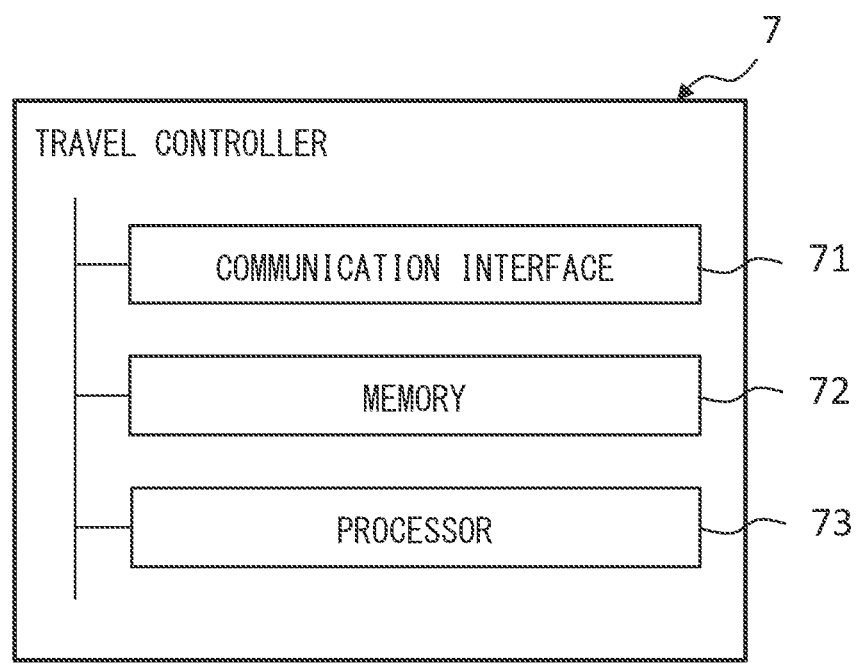
FIG. 2 schematically illustrates the hardware of the travel controller.

FIG. 2 schematically illustrates the hardware of the travel controller 7. The travel controller 7 includes a communication interface 71, a memory 72, and a processor 73.

The communication interface 71 is an example of a communication unit, and includes a communication interface circuit for connecting the travel controller 7 to the in-vehicle network. The communication interface 71 provides received data for the processor 73, and outputs data provided from the processor 73 to an external device.

The memory 72 is an example of a storage unit, and includes volatile and nonvolatile semiconductor memories. The memory 72 stores various types of data used for processing by the processor 73, such as a distance threshold for determining the distance range ahead of a current position in which a non-lane zone may be detected, and travel-lane side information indicating on which side of each road a travel lane lies. The memory 72 also stores various application programs, such as a travel control program for executing a travel control process.

The processor 73 is an example of a control unit, and includes one or more processors and a peripheral circuit thereof. The processor 73 may further include another operating circuit, such as a logic-arithmetic unit, an arithmetic unit, or a graphics processing unit.

Figure 3:
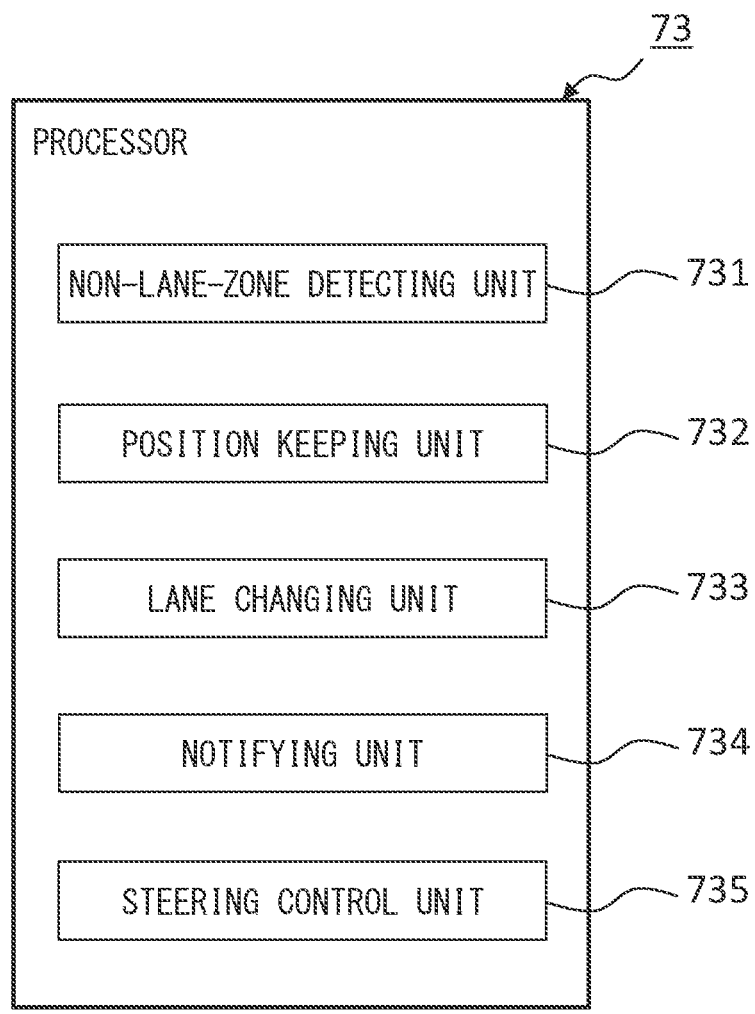
FIG. 3 is a functional block diagram of a processor included in the travel controller.

FIG. 3 is a functional block diagram of the processor 73 included in the travel controller 7.

As its functional blocks, the processor 73 of the travel controller 7 includes a non-lane-zone detecting unit 731, a position keeping unit 732, a lane changing unit 733, a notifying unit 734, and a steering control unit 735. These units included in the processor 73 are functional modules implemented by a program executed on the processor 73, or may be implemented in the travel controller 7 as separate integrated circuits, microprocessors, or firmware.

The non-lane-zone detecting unit 731 inputs an image received from the camera 2 via the communication interface into a classifier that has been trained to detect lane lines, thereby detecting lane lines ahead of the vehicle 1. Lane lines are lines drawn for dividing lanes on a road.

The classifier may be, for example, a convolution neural network (CNN) including multiple layers connected in series from the input toward the output. A CNN that has been trained using inputted images including lane lines as training data operates as a classifier to detect lane lines.

The non-lane-zone detecting unit 731 detects a non-lane zone within a predetermined distance ahead of the current position of the vehicle, based on lane lines detected from the received image. When three or more lane lines arrayed in the horizontal direction of the image are detected, the non-lane-zone detecting unit 731 determines that the road defined by the leftmost and rightmost lane lines is divided into multiple lanes by the intervening lane lines. When a lane zone divided into multiple lanes, a zone where only two lane lines are detected, and another lane zone are sequentially detected from the bottom to the top of the image, the non-lane-zone detecting unit 731 determines that the zone where only two lane lines are detected is a non-lane zone.

The non-lane-zone detecting unit 731 may detect a non-lane zone, based on a high-precision map stored in the storage device 6. For example, the non-lane-zone detecting unit 731 receives a positioning signal from the GNSS receiver 5, and obtains a high-precision map of the location corresponding to the positioning signal from the storage device 6. The non-lane-zone detecting unit 731 then detects a non-lane zone, based on information on lane lines in the high-precision map.

The position keeping unit 732 outputs a control signal to a travel mechanism (not shown) of the vehicle 1 via an input/output interface in a non-lane zone so as to keep the position of the vehicle relative to the width of the whole road. The travel mechanism includes, for example, an engine for supplying motive power to the vehicle 1, a brake for decreasing the travel speed of the vehicle 1, and the steering mechanism for steering the vehicle 1.

The position keeping unit 732 detects, as the width of the whole road, the horizontal interval between the lane line, among the lane lines detected from the image, closest to the left end of the image and that closest to the right end thereof. The position keeping unit 732 then controls travel of the vehicle 1 so that the ratio of the horizontal distance from the lane line at one end in the horizontal direction (e.g., left end) to a predetermined position of the vehicle 1 (e.g., the longitudinal center line) to the width of the whole road will be constant.

The width of the whole road may include the widths of portions other than lanes, such as road shoulders. For example, the position keeping unit 732 may detect, as the width of the whole road, the horizontal width of a region identified as a road by a classifier that identifies a road region, and the region identified as a road may include portions other than lanes.

The lane changing unit 733 outputs a control signal to the travel mechanism of the vehicle 1 so as to move to a lane having a larger overlap with the vehicle 1, when an expected position of the vehicle 1 at the end of a non-lane zone straddles a lane line.

When there is a lane line whose horizontal distance at the end point of the non-lane zone from the lane line at one end in the horizontal direction (e.g., left end) is between the distance from the latter lane line to the left end of the vehicle 1 and that to the right end of the vehicle, the lane changing unit 733 determines that the vehicle 1 straddles the former lane line. The lane changing unit 733 then identifies the lane on the side of the left or right end of the vehicle 1 whose horizontal distance from the straddled lane line is longer as the lane having a larger overlap with the vehicle 1.

The notifying unit 734 transmits a display signal to display information for notifying, from detection of a non-lane zone until the vehicle 1 reaches the non-lane zone, the driver of the vehicle 1 of a request to hold the steering wheel 3 to the meter display 4 via the communication interface 71. The information for notifying the driver of the vehicle 1 of a request to hold the steering wheel 3 is, for example, a message such as "Hold the steering wheel," and an image showing the state in which the steering wheel is held. The notifying unit 734 may transmit a voice signal to play back a voice to make a notification of a request to hold the steering wheel to a vehicle-mounted speaker (not shown) via the communication interface 71.

The steering control unit 735 sets reactive force against turning the steering wheel 3 by the driver of the vehicle 1. The steering control unit 735 transmits via the communication interface 71 a reactive-force setting signal for setting the reactive force to a steering controller (not shown) that controls an actuator (not shown) provided for the steering wheel 3. The steering control unit 735 transmits the reactive-force setting signal to the steering controller so as to reduce the reactive force during travel in a non-lane zone lower than the reactive force during travel in a zone other than a non-lane zone.

Control by the steering control unit 735 to reduce reactive force of the steering wheel 3 during travel in a non-lane zone enables the driver to turn the steering wheel 3 with smaller force.

Figure 4:
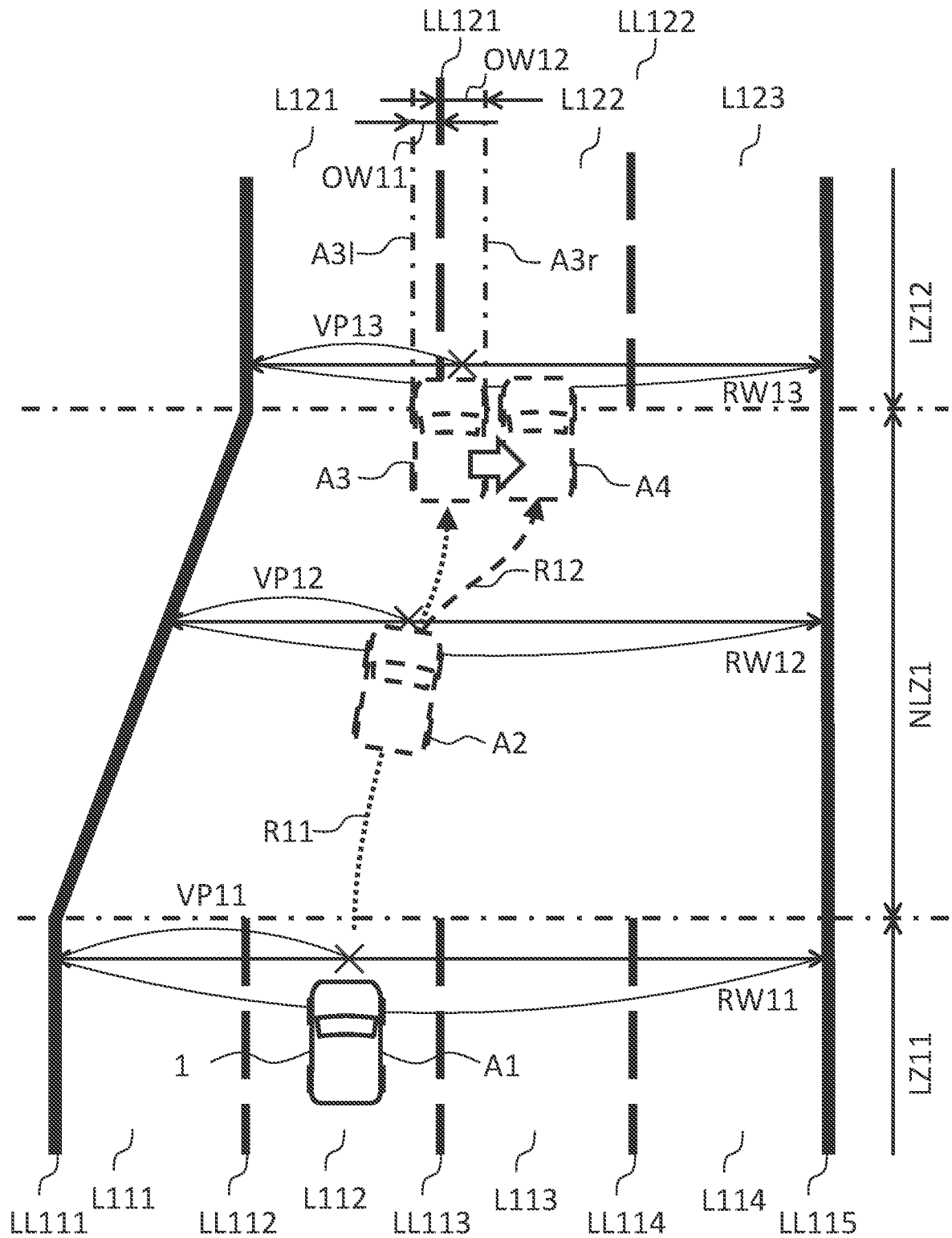
FIG. 4 is a diagram for describing a first example of travel control.

FIG. 4 illustrates a first example of travel control.

The vehicle 1 is traveling at a position A1 from the bottom to the top of the figure. At this time, the non-lane-zone detecting unit 731 of the vehicle 1 detects, from an image captured by the camera 2, five lane lines LL111-LL115 arrayed in the horizontal direction of the image. Since more than three lane lines arrayed in the horizontal direction of the image are detected, the zone of the road through which the vehicle 1 is traveling is a lane zone LZ11 divided into multiple lanes. More specifically, the position A1 is included in the second lane L112 from the left in the lane zone LZ11.

At the position A1, the non-lane-zone detecting unit 731 detects a non-lane zone NLZ1 where only the two lane lines LL111 and LL115 arrayed in the horizontal direction of the image are detected. The non-lane-zone detecting unit 731 also detects a lane zone LZ12 where four lane lines LL111, LL121, LL122, and LL115 arrayed in the horizontal direction of the image are detected.

The width of the whole road at the position A1 in the lane zone LZ11 is an interval RW11 between the leftmost lane line LL111 and the rightmost lane line LL115. The distance from the leftmost lane line LL111 to the longitudinal center line of the vehicle 1 is VP11. The position keeping unit 732 controls travel of the vehicle 1 so that the ratio of the horizontal distance from the leftmost lane line to the longitudinal center line of the vehicle 1 to the width of the whole road will equal a constant VP11/RW11.

The horizontal distance VP12 from the leftmost lane line to the longitudinal center line of the vehicle 1 at a position A2 in the non-lane zone NLZ1 is set as follows, using the width RW12 of the whole road at the position A2 and the constant VP11/RW11.

$$VP12 = RW12 \times VP11/RW11$$

The horizontal distance VP13 from the leftmost lane line to the longitudinal center line of the vehicle 1 at a position A3 where the non-lane zone NLZ1 ends is set as follows, using the width RW13 of the whole road at the position A3 and the constant VP11/RW11 at the position A1.

$$VP13 = RW13 \times VP11/RW11$$

The position keeping unit 732 controls travel of the vehicle 1 so that it will travel along a route R11 leading from the position A1 via the position A2 to the position A3.

At the position A3, the distance from the leftmost lane line LL111 to the lane line LL121 is between the distance from the leftmost lane line LL111 to the left end A3l of the vehicle 1 and the distance from the leftmost lane line LL111 to the right end A3r of the vehicle 1. Hence the lane changing unit 733 determines that the vehicle 1 straddles the lane line LL121 at the position A3. Based on this determination, the lane changing unit 733 controls travel of the vehicle 1 so as to move to a lane having a larger overlap with the vehicle 1.

The distance from the left end A3l of the vehicle 1 to the lane line LL121 is OW11. The distance from the lane line LL121 to the right end A3r of the vehicle 1 is OW12 longer than OW11. Hence the lane changing unit 733 identifies a lane L122 defined by the lane lines LL121 and LL122 and located on the side of the right end A3r of the vehicle as the lane having a larger overlap with the vehicle 1.

The lane changing unit 733 then controls travel of the vehicle 1 so that the vehicle 1 will travel along a route R12 toward a position A4 in the second lane L122 from the left.

Figure 5:
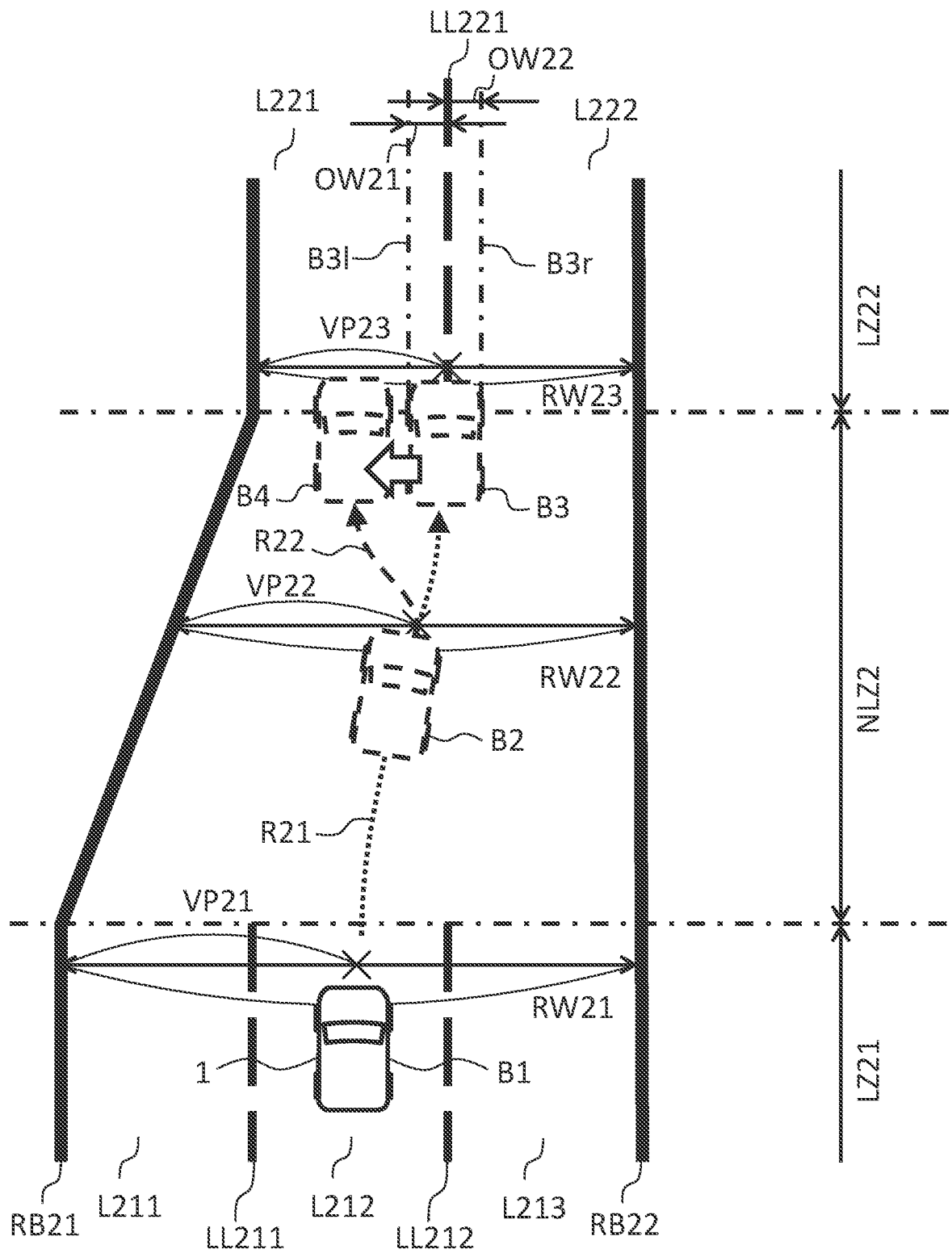
FIG. 5 is a diagram for describing a second example of travel control.

FIG. 5 illustrates a second example of travel control.

The vehicle 1 is traveling at a position B1 from the bottom to the top of the figure. The position B1 is included in the second lane L212 from the left in a lane zone LZ21. In a non-lane zone NLZ2 ahead of the vehicle 1, the position keeping unit 732 controls travel of the vehicle 1 so that the ratio of the horizontal distance from the leftmost lane line to the longitudinal center line of the vehicle 1 to the width of the whole road will equal a constant VP21/RW21, which is the ratio at the position B1.

The position keeping unit 732 controls travel of the vehicle 1 so that it will travel along a route R21 leading from the position B1 via a position B2 to a position B3.

At the position B3, the vehicle 1 straddles a lane line LL221. At this time, the distance OW21 from the left end B3l of the vehicle 1 to the lane line LL221 equals the distance OW22 from the lane line LL221 to the right end B3r of the vehicle 1. In other words, overlaps with the vehicle 1 in lanes L221 and L222 divided by the lane line LL221 are equal.

In this case, the lane changing unit 733 controls travel of the vehicle 1 so as to move to a lane on the side of a travel lane.

The lane changing unit 733 determines the lane on the side of a travel lane, based on the travel-lane side information stored in the memory 72. For example, of the lanes L221 and L222, the lane changing unit 733 identifies the lane L221 on the left with respect to the travel direction as the lane on the side of a travel lane, based on the travel-lane side information indicating that the travel lane is disposed on the left.

The lane changing unit 733 controls travel of the vehicle 1 so that the vehicle 1 will travel along a route R22 toward a position B4 in the lane L221.

Figure 6:
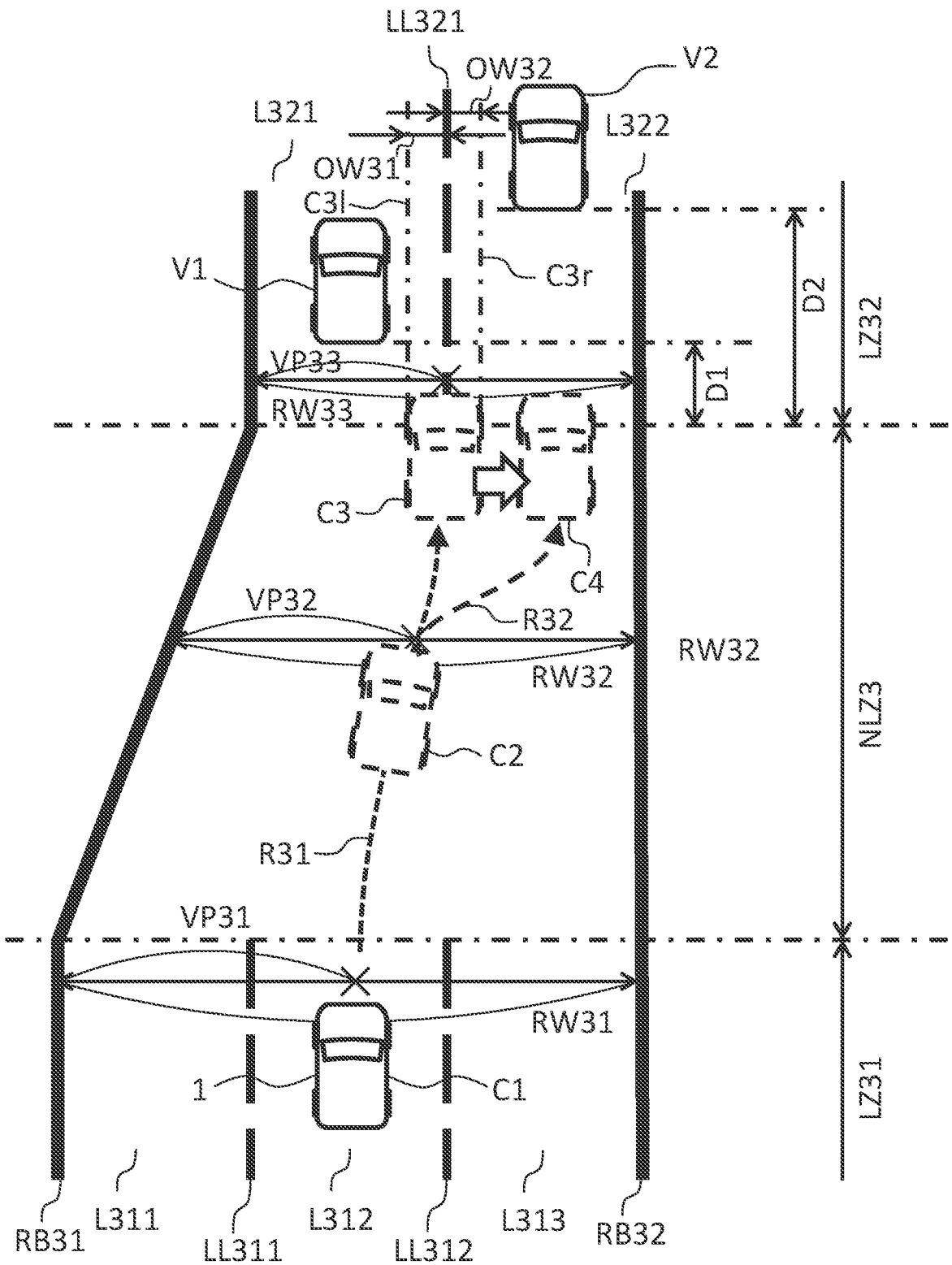
FIG. 6 is a diagram for describing a third example of travel control.

FIG. 6 illustrates a third example of travel control.

The vehicle 1 is traveling at a position C1 from the bottom to the top of the figure. The position C1 is included in the second lane L312 from the left in a lane zone LZ31. In a non-lane zone NLZ3 ahead of the vehicle 1, the position keeping unit 732 controls travel of the vehicle 1 so that the ratio of the horizontal distance from the leftmost lane line to the longitudinal center line of the vehicle 1 to the width of the whole road will equal a constant VP31/RW31, which is the ratio at the position C1.

The position keeping unit 732 controls travel of the vehicle 1 so that it will travel along a route R31 leading from the position C1 via a position C2 to a position C3.

At the position C3, the vehicle 1 straddles a lane line LL321. At this time, the distance OW31 from the left end C31 of the vehicle 1 to the lane line LL321 equals the distance OW32 from the lane line LL321 to the right end C3r of the vehicle 1. In other words, overlaps with the vehicle 1 in lanes L321 and L322 divided by the lane line LL321 are equal.

In this case, the lane changing unit 733 controls travel of the vehicle 1 so as to move to a lane such that the distance from the vehicle 1 to a leading vehicle in this lane will be longer when the vehicle 1 reaches the position C3.

For example, based on a vertical position in an image captured by the camera 2, the lane changing unit 733 determines the distance to each leading vehicle so that the higher the position of the leading vehicle, the longer the distance thereto. The lane changing unit 733 also determines the speed of each leading vehicle, based on variations in distance to the leading vehicle, depending on the time and the speed of the vehicle 1. The lane changing unit 733 then estimates the distance from the vehicle 1 to each leading vehicle at the time when the vehicle 1 reaches the position C3, based on the distance to the leading vehicle, the speed of the leading vehicle, the speed of the vehicle 1, and the distance to the position C3. In the example of FIG. 6, when the vehicle 1 reaches the position C3, the distance to a leading vehicle V1 on the lane L321 is D1 and the distance to a leading vehicle V2 on the lane L322 is D2 longer than D1.

The lane changing unit 733 may determine the distance to each leading vehicle so that the smaller the horizontal size of the leading vehicle, the longer the distance thereto, based on the horizontal size in an image captured by the camera 2. The lane changing unit 733 may determine the distance to each leading vehicle, based on a range image, whose pixels each have a value depending on the distance to an object, obtained by a light detection and ranging (LiDAR) sensor (not shown).

The lane changing unit 733 controls travel of the vehicle 1 so that the vehicle 1 will travel along a route R32 toward a position C4 in the lane L322 in which the distance to the leading vehicle is longer.

Figure 7:
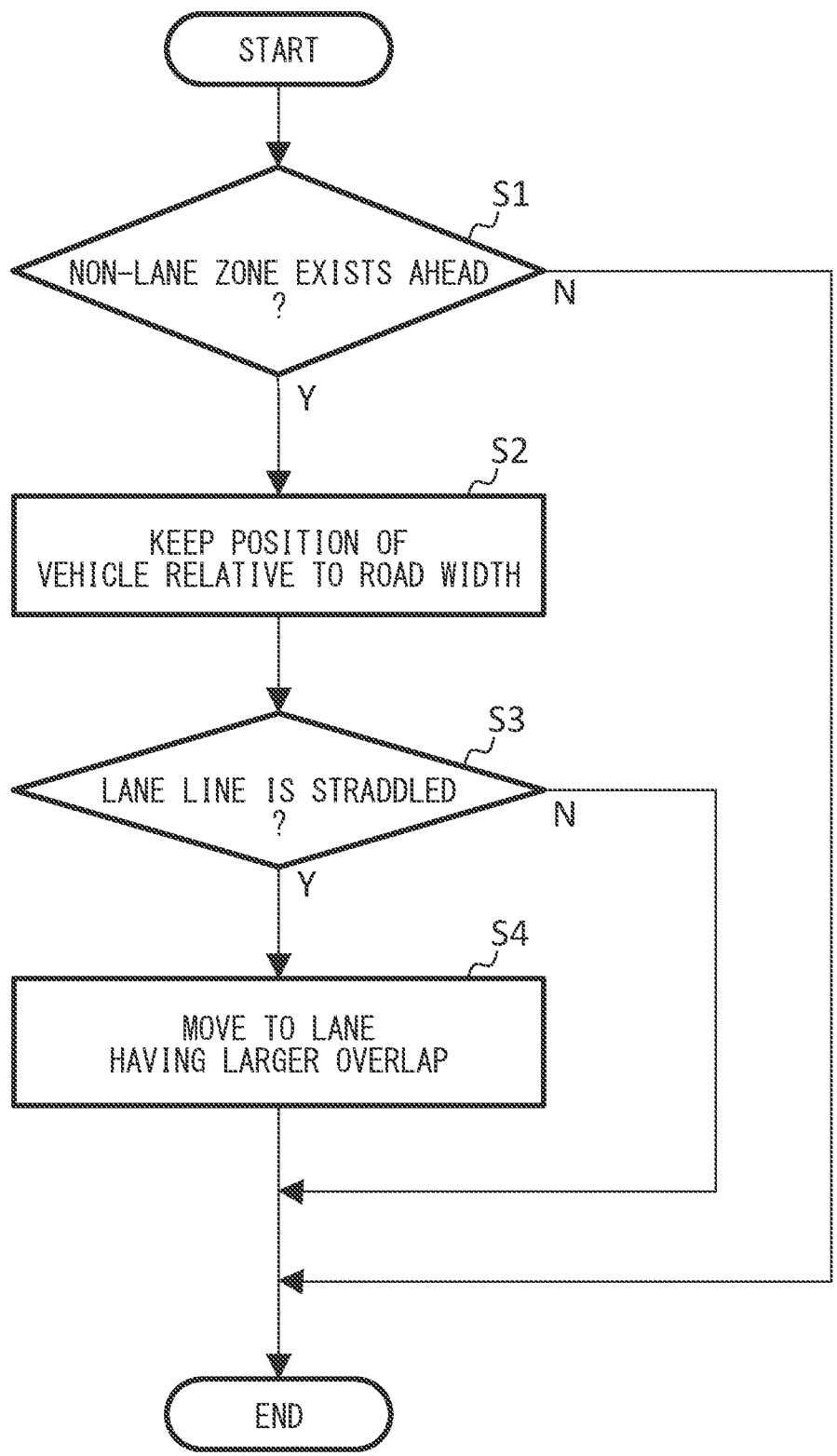
FIG. 7 is a flowchart of a travel control process.

FIG. 7 is a flowchart of a travel control process. The travel controller 7 repeats this process at predetermined intervals (e.g., intervals of 1/10 seconds) during travel of the vehicle 1.

First, the non-lane-zone detecting unit 731 determines whether a non-lane zone is detected within a predetermined distance ahead of the current position of the vehicle 1 (step S1). If no non-lane zone is detected (No in step S1), the processor 73 of the travel controller 7 terminates the travel control process. If a non-lane zone is detected ahead (Yes in step S1), the position keeping unit 732 controls travel of the vehicle 1 in the non-lane zone so as to keep the position of the vehicle 1 relative to the width of the whole road (step S2). Next, the lane changing unit 733 determines whether an expected position of the vehicle 1 at the end of the non-lane zone straddles a lane line (step S3). If it is determined that it straddles a lane line (Yes in step S3), the lane changing unit 733 controls travel of the vehicle 1 so as to move to a lane having a larger overlap with the vehicle (step S4) and terminates the travel control process. If it is determined that it does not straddle a lane line (No in step S3), the processor 73 of the travel controller 7 terminates the travel control process.

Executing the travel control process in this way, the travel controller 7 can reduce lane changes unexpected for a driver before and after a non-lane zone.

Note that those skilled in the art can apply various changes, substitutions, and modifications without departing from the spirit and scope of the present disclosure.

What is claimed is:

1. A travel controller comprising a processor configured to detect a non-lane zone within a predetermined distance ahead of a current position of a vehicle, the non-lane zone lacking lanes;
control travel of the vehicle in the non-lane zone so as to keep the relative position of the vehicle relative to the changing width of a whole road; and
control travel of the vehicle so as to move to a lane having a larger overlap with the vehicle, prior to control of travel of the vehicle to keep the position of the vehicle relative to the width of the whole road, when an expected position of the vehicle at the end of the non-lane zone straddles a lane line;
wherein the processor is further configured to notify a driver of the vehicle of a request from detection of the non-lane zone until the vehicle reaches the non-lane zone, the request asking the driver to hold a steering wheel; and
wherein the processor is further configured to reduce reactive force against turning the steering wheel during travel in the non-lane zone lower than reactive force during travel in a zone other than the non-lane zone.

2. The travel controller according to claim 1, wherein in control of travel of the vehicle for the case that an expected position of the vehicle at the end of the non-lane zone straddles a lane line, the processor is configured to control travel of the vehicle so as to move to a lane on the side of a travel lane of the road, in the case that overlaps with the vehicle in two lanes divided by the lane line straddled by the expected position of the vehicle are equal.

3. The travel controller according to claim 1, wherein in control of travel of the vehicle for the case that an expected position of the vehicle at the end of the non-lane zone straddles a lane line, the processor is configured to control travel of the vehicle so as to move to a lane such that the distance from the vehicle to a leading vehicle in the lane will be longer when the vehicle reaches the expected position, in the case that overlaps with the vehicle in two lanes divided by the lane line straddled by the expected position of the vehicle are equal.

4. A method for travel control, comprising:
- detecting a non-lane zone within a predetermined distance ahead of a current position of a vehicle, the non-lane zone lacking lanes;
- controlling travel of the vehicle in the non-lane zone so as to keep the relative lateral position of the vehicle relative to the changing width of a whole road;
- controlling travel of the vehicle so as to move to a lane having a larger overlap with the vehicle, prior to control of travel of the vehicle to keep the position of the vehicle relative to the width of the whole road, when an expected position of the vehicle at the end of the non-lane zone straddles a lane line;
- notifying a driver of the vehicle of a request from detection of the non-lane zone until the vehicle reaches the non-lane zone, the request asking the driver to hold a steering wheel; and
- reducing reactive force against turning the steering wheel during travel in the non-lane zone lower than reactive force during travel in a zone other than the non-lane zone.

* * * * *